(12) United States Patent
Guy et al.

(10) Patent No.: US 8,530,562 B2
(45) Date of Patent: *Sep. 10, 2013

(54) RUBBER COMPOSITIONS COMPRISING COUPLING AGENTS AND COATING AGENTS AND ALSO INORGANIC FILLERS

(75) Inventors: Laurent Guy, Rillieux la Pape (FR); Michel Fernandez, Lyons (FR); Sébastien Sterin, Saint Cyr au Mont d'Or (FR)

(73) Assignee: Rhodia Chimie, Aubervilliers (FR)

( * ) Notice: Subject to any disclaimer, the term of this patent is extended or adjusted under 35 U.S.C. 154(b) by 964 days.

This patent is subject to a terminal disclaimer.

(21) Appl. No.: 11/921,011

(22) PCT Filed: May 19, 2006

(86) PCT No.: PCT/FR2006/001144
§ 371 (c)(1),
(2), (4) Date: Feb. 17, 2009

(87) PCT Pub. No.: WO2006/125897
PCT Pub. Date: Nov. 30, 2006

(65) Prior Publication Data
US 2009/0221737 A1 Sep. 3, 2009

(30) Foreign Application Priority Data
May 26, 2005 (FR) ..................... 05 05287

(51) Int. Cl.
*C08K 3/36* (2006.01)
(52) U.S. Cl.
USPC ........... 524/430; 524/571; 524/556; 524/567; 524/493; 524/526
(58) Field of Classification Search
USPC ................. 524/430, 493, 571, 556, 567, 526
See application file for complete search history.

(56) References Cited

U.S. PATENT DOCUMENTS

| | | | | |
|---|---|---|---|---|
| 4,118,367 A | * | 10/1978 | Dawes et al. | 524/575 |
| 6,053,226 A | * | 4/2000 | Agostini | 152/209.5 |
| 6,774,255 B1 | * | 8/2004 | Tardivat et al. | 556/427 |
| 2003/0114601 A1 | * | 6/2003 | Cruse et al. | 525/332.6 |

FOREIGN PATENT DOCUMENTS

FR 2839720 A1 11/2003

OTHER PUBLICATIONS

Dawes, K et al., "Chemical modification of natural rubber—a new silane coupling agent," Plastics and Rubber: Materials and Applications. Feb. 1978, pp. 24-25, XP0009060017, London, England.

* cited by examiner

*Primary Examiner* — Robert D. Harlan
(74) *Attorney, Agent, or Firm* — Dentons US LLP

(57) ABSTRACT

Elastomeric isoprene rubber compositions contain an effective amount of a coupling system (A) as an inorganic filler/elastomer coupling agent, and (B) at least one natural or synthetic rubber elastomer, (C) an inorganic filler as reinforcing filler, (D) other conventional constituents or additives comprising (a) vulcanization agent(s), the coupling system (A) being a particular mixture of the following combination of constituents (A1) and (A2): (A1) is at least one coupling agent selected from among the following functionalized organosilicon compounds of formula (I):$[(G^0)_3SiO_{1/2}]_m[(G^0)_2SiO_{2/2}]_n[G^0SiO_{3/2}]_o[SiO_{4/2}]_p[(G^2)_a(G^1)_a(Z-CO-N=N-CO-A)SiO_{(3-a-a'/2}]_g$ and (A2) is at least one coating agent for the reinforcing filler including one compound with the single function Y in the structure thereof which is capable of bonding physically and chemically to the inorganic filler and resulting in an increase in dispersion of the charge within the rubber matrix and a reduction in viscosity of the composition.

20 Claims, No Drawings

RUBBER COMPOSITIONS COMPRISING COUPLING AGENTS AND COATING AGENTS AND ALSO INORGANIC FILLERS

CROSS-REFERENCE TO EARLIER APPLICATIONS

This application is the United States national stage of PCT/FR 2006/001144, filed May 19, 2006 and designating the United States (published in the French language on Nov. 30, 2006 as WO 2006/125897 A3; the title and abstract were also published in English), which claims priority under 35 U.S.C. §119 of FR 05/05287, filed May 26, 2005, each hereby expressly incorporated by reference in its entirety and each assigned to the assignee hereof.

The field of the present invention is that of the use of a particular combination of a coupling agent and a covering agent, as a coupling system (white filler—elastomer) in rubber compositions comprising an inorganic filler as reinforcing filler. The invention also relates to the elastomer compositions obtained by means of using said coupling system, and also to elastomeric articles having a body comprising the abovementioned compositions.

The types of elastomeric articles in which the invention is most useful are those that are especially subject to the following stresses: temperature variations and/or large-frequency stress variations in a dynamic regime; and/or a substantial static stress and/or a large strain fatigue in a dynamic regime. Such types of articles are, for example: seals for household electrical appliances, supports acting as engine vibration extractors either with metallic armatures or with a hydraulic fluid inside the elastomer, cable sheaths, shoe soles and rollers for cable cars.

This has especially been made possible by virtue of the development of novel elastomeric compositions reinforced with specific inorganic fillers termed "reinforcing" fillers, of high dispersibility, which are capable of competing with conventional carbon black from a reinforcing viewpoint, and which also offer these compositions lower hysteresis, which is especially synonymous with a reduction in the internal heating of the elastomeric articles (for example such as those mentioned above) during their use, in service.

The implementation (or "processability") of rubber compositions containing such fillers nevertheless remains more difficult than for rubber compositions conventionally filled with carbon black. In particular, it is necessary to use a coupling agent, also known as a binder, whose function is to ensure the connection between the surface of the inorganic filler particles and the elastomer, while at the same time facilitating the dispersion of this inorganic filler in the elastomeric matrix.

It is recalled here that the term "coupling agent" (inorganic filler-elastomer) should be understood as meaning, in a known manner, an agent capable of establishing a sufficient connection, of chemical and/or physical nature, between the inorganic filler and the elastomer.

Such a coupling agent, which is at least bifunctional, has the simplified general formula "Y—W—X", in which:
  Y represents a functional group (function "Y") capable of physically and/or chemically bonding to the inorganic filler, such a bond possibly being established, for example, between a silicon atom of the coupling agent and the surface hydroxyl (OH) groups of the inorganic filler (for example the surface silanols when it is silica);
  X represents a functional group (function "X") capable of physically and/or chemically bonding to the elastomer, for example via a suitable atom or group of atoms;
  W represents a divalent group allowing "Y" and "X" to be connected.

Coupling agents should in particular not be confused with simple agents for covering the inorganic filler, which, in a known manner, may comprise the function "Y" that is active towards the inorganic filler, but which in any case lack the function "X" that is active towards the elastomer.

Coupling agents, especially (silica-elastomer), have been described in a large number of patent documents, the most well known being bifunctional sulfurous silanes, in particular sulfurous alkoxysilanes, which are at the present time considered as being products that provide, for silica-charged vulcanizates, the best compromise in terms of scorching safety, ease of use and reinforcing power. Among these sulfurous silanes, mention should be made most particularly of bis(3-triethoxysilylpropyl) tetrasulfide (abbreviated as TESPT), which is the reference coupling agent in rubber compositions comprising an inorganic filler as reinforcing filler.

It is still sought at the present time to improve the performance qualities of these coupling agents for an inorganic filler such as, for example, silica.

In particular, the need is particularly present in the case of rubber matrices based on an isoprene elastomer in which, in a known manner, an effective bond with the elastomer is much more difficult to obtain, when compared with the use of carbon black.

Thus, although it is known, admittedly, how to reduce hysteresis and thus especially to reduce the internal heating of isoprene-based elastomeric articles during their use by replacing carbon black with an inorganic filler such as silica, this unfortunately takes place to the detriment of the reinforcement of the rubber matrix. This is so much so the case that silicas are still little used in isoprene-based elastomeric matrices, when compared with carbon black.

Now, the Applicant has discovered a novel inorganic filler-isoprene elastomer coupling system that makes it possible to reconcile, even in natural rubber matrices, the two contradictory objectives, namely improving the hysteresis and the reinforcement. More specifically, such a system thus makes it possible not only to further reduce the hysteresis, compared with a conventional coupling agent of the sulfurous silane type, but also to achieve a level of reinforcement at least equal to that available with carbon black.

First Subject of the Invention

This objective, among others, is achieved by the present invention, which concerns, in a first subject, the use:
  of an effective amount of a coupling system (A) (inorganic filler-elastomer) comprising a functionalized organosilane bearing at least two functions noted "X" or "Y", which may be grafted on the one hand onto the elastomer by means of the function "X", and on the other hand onto the inorganic filler by means of the function "Y";
  as inorganic filler-elastomer coupling agent in rubber compositions comprising:
    (B) at least one elastomer of natural or synthetic rubber type;
    (C) an inorganic filler as reinforcing filler;
    (D) all or part of the other constituents or additives chosen from: one (or more) curing agent(s) (D1), optionally one (or more) curing accelerator(s) (D2), optionally one (or more) curing activator(s) (D3), optionally one (or more) non-white reinforcing filler(s) (D4), optionally one (or more) non-reinforcing or sparingly reinforcing inorganic filler(s) (D5), optionally one (or more) protecting agent(s) (D6), optionally one (or more) plasticizer(s) (D7), and mixtures of these species;

said use being characterized in that:

the coupling system (A) consists of a particular combination residing in the combination of the ingredients (A1) and (A2) below:

(A1) being at least one coupling agent chosen from the group of coupling agents in which each member is a compound constituted essentially of a functionalized organosilicon compound of formula (I) comprising the units having the following general formulae:

$$[(G^0)_3SiO_{1/2}]_m[(G^0)_2SiO_{2/2}]_n[G^0SiO_{3/2}]_o[SiO_{4/2}]_p$$
$$[(G^2)_a(G^1)_{a'}(Z-CO-N=N-CO-A)$$
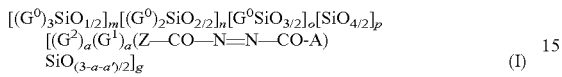
$$SiO_{(3-a-a')/2}]_q \quad (I)$$

in which:

m, n, o and p each represent an integer or fraction greater than or equal to 0;

q represents an integer or fraction greater than or equal to 1;

a represents an integer chosen from 0, 1, 2 and 3;

a' represents an integer chosen from 0, 1 and 2;

the sum a+a' is in the range from 0 to 3, with the conditions according to which: when a=0, then at least one of the symbols $G^0$ corresponds to the definition given below for $G^2$; and when a+a'=3, then m=n=o=p=0 (zero);

the symbols $G^0$, which may be identical or different, each represent one of the groups corresponding to $G^2$ or $G^1$;

the symbols $G^2$, which may be identical or different, each represent: a hydroxyl group or a hydrolyzable monovalent group;

the symbols $G^1$, which may be identical or different, each represent: a saturated or unsaturated aliphatic hydrocarbon-based group; a saturated or unsaturated and/or aromatic, monocyclic or polycyclic carbocyclic group; or a group representing a saturated or unsaturated aliphatic hydrocarbon-based part and a carbocyclic part as defined above; with the additional possibility according to which, where appropriate, a group $G^1$ may form, with a group $G^2$ and the silicon atom to which $G^1$ and $G^2$ are attached, a monocyclic or polycyclic carbocyclic group containing from 2 to 10 ring carbon atoms and possibly comprising one or more ring oxygen heteroatom(s);

the symbol Z represents a divalent radical chosen from: a saturated or unsaturated aliphatic hydrocarbon-based group; a saturated, unsaturated and/or aromatic, monocyclic or polycyclic carbocyclic group; and a group containing a saturated or unsaturated aliphatic hydrocarbon-based part and a carbocyclic part as defined above; said divalent radical being optionally substituted or interrupted with an oxygen atom and/or a sulfur atom and/or a nitrogen atom, said nitrogen atom bearing one monovalent group chosen from: a hydrogen atom; a saturated or unsaturated aliphatic hydrocarbon-based atom; a saturated or unsaturated and/or aromatic, monocyclic or polycyclic carbocyclic group; and a group containing a saturated or unsaturated aliphatic hydrocarbon-based part and a carbocyclic part as defined above;

the symbol A represents:

a saturated or unsaturated aliphatic hydrocarbon-based group; a saturated or unsaturated and/or aromatic, monocyclic or polycyclic carbocyclic group; or a group representing a saturated or unsaturated aliphatic hydrocarbon-based part and a carbocyclic part as defined above;

a group —X-$G^3$ in which: X represents —O—, —S— or —N$G^4$- with $G^4$ taking any of the meanings given above for $G^1$; $G^3$, which may be identical to or different from $G^4$, represents any of the groups defined for $G^1$; the substituents $G^3$ and $G^4$ of the group —N$G^4G^3$ also possibly forming, together with the nitrogen atom to which they are attached, a single 5- to 7-membered ring comprising in the ring from 3 to 6 carbon atoms, 1 or 2 nitrogen atom(s) and optionally 1 or 2 unsaturated double bond(s);

or, when q=1, a group $[-Z-SiO_{(3-a-a')/2}(G^2)_a(G^1)_{a'}]$ $[(G^0)_3SiO_{1/2}]_m[(G^0)_2SiO_{2/2}]_n[G^0SiO_{3/2}]_o[SiO_{4/2}]_p$ in which the symbols Z, $G^0$, $G^1$, $G^2$, a, a', m, n, o and p have the definitions given above;

(A2) being at least one agent for covering the reinforcing filler consisting in a compound, comprising in its structure the sole function "Y", which is capable of physically and/or chemically bonding to the inorganic filler and is capable, by means of improving the dispersion of the filler in the rubber matrix and of lowering the viscosity of the compositions, of improving the ease of use of the compositions in crude form;

said coupling system (A) is incorporated into rubber compositions based on isoprene elastomers.

For the purposes of the invention, the expression "functionalized organosilicon compound (I)" is intended to define the following compounds:

(i) at least one functionalized organosilane corresponding to formula (I) in which m=n=o=p=0 (zero), q=1 and a+a'=3;

(2i) at least one functionalized siloxane oligomer corresponding to formula (I) in which: the sum a+a' is then in the range from 0 to 2, and either at least one of the m, n, o and p is a number other than 0 (zero) and q has a value greater than or equal to 1, or q is greater than 1 and each of the m, n, o and p has any value; and (3i) a mixture of functionalized organosilane(s) (i) and/or of functionalized siloxane oligomer(s) (2i).

As regards the functionalized siloxane oligomers corresponding to formula (I), those that are advantageously targeted in the present invention are the species (2i) corresponding to the definitions given above, in formula (I), in which the sum m+n+o+p+q (corresponding to the number of silicon atoms in the oligomer) is in the range from 2 to 20 and preferably from 2 to 12, for example from 2 to 6.

In the abovementioned formula (I), it should be understood that the group (Z—CO—N=N—CO-A) is linked to the Si atom of the unit $SiO_{(3-a-a')/2}$ via the divalent radical —Z—.

In the abovementioned formula (I), the function "X" of the coupling agent is the activated azo function CO—N=N—CO, whereas the function "Y" is a hydroxyl/hydrolyzable function —Si-$G^0$ and/or —Si-$G^2$.

In the text appearing above, the term "aliphatic hydrocarbon-based group" means an optionally substituted linear or branched group preferably containing from 1 to 25 carbon atoms.

Advantageously, said aliphatic hydrocarbon-based group contains from 1 to 18 carbon atoms, better still from 1 to 8 carbon atoms and even better still from 1 to 6 carbon atoms.

Saturated aliphatic hydrocarbon-based groups that may be mentioned include alkyl groups such as methyl, ethyl, propyl, isopropyl, n-butyl, isobutyl, t-butyl, pentyl, isopentyl, neopentyl, 2-methylbutyl, 1-ethylpropyl, hexyl, isohexyl, neohexyl, 1-methylpentyl, 3-methylpentyl, 1,1-dimethylbutyl, 1,3-dimethylbutyl, 2-ethylbutyl, 1-methyl-1-ethylpropyl, heptyl, 1-methylhexyl, 1-propylbutyl, 4,4-dimethylpentyl, octyl, 1-methylheptyl, 2-ethylhexyl, 5,5-dimethylhexyl, nonyl, decyl, 1-methylnonyl, 3,7-dimethyloctyl, 7,7-dimethyloctyl and hexadecyl radicals.

The unsaturated aliphatic hydrocarbon-based groups comprise one or more unsaturations, preferably one, two or three unsaturations of ethylenic type (double bond) and/or acetylenic type (triple bond).

Examples of these are alkenyl or alkynyl groups derived from the alkyl groups defined above by removal of two or more hydrogen atoms. Preferably, the unsaturated aliphatic hydrocarbon-based groups comprise only one unsaturation.

In the context of the invention, the term "carbocyclic group" means an optionally substituted monocyclic or polycyclic radical, preferably of $C_3$-$C_{50}$. Advantageously, it is a $C_3$-$C_{18}$ radical, which is preferably mono-, bi- or tricyclic. When the carbocyclic group comprises more than one ring nucleus (in the case of polycyclic carbocycles), the ring nuclei are fused in pairs. Two fused nuclei may be ortho-fused or peri-fused.

Unless otherwise indicated, the carbocyclic group may comprise a saturated part and/or an aromatic part and/or an unsaturated part.

Examples of saturated carbocyclic groups are cycloalkyl groups. Preferably, the cycloalkyl groups are of $C_3$-$C_{18}$ and better still $C_5$-$C_{10}$. Mention may be made especially of cyclopentyl, cyclohexyl, cycloheptyl, cyclooctyl, adamantyl and norbornyl radicals.

The unsaturated carbocycle or any unsaturated part of carbocyclic type contains one or more ethylenic unsaturations, preferably one, two or three. It advantageously contains from 6 to 50 and better still from 6 to 20 carbon atoms, for example from 6 to 18 carbon atoms. Examples of unsaturated carbocycles are $C_6$-$C_{10}$ cycloalkenyl groups.

Examples of aromatic carbocyclic radicals are ($C_6$-$C_{18}$) aryl and better still ($C_6$-$C_{12}$)aryl groups and especially phenyl, naphthyl, anthryl and phenanthryl.

A group containing both a hydrocarbon-based aliphatic part as defined above and a carbocyclic part as defined above is, for example, an arylalkyl group such as benzyl, or an alkylaryl group such as tolyl.

The substituents on the hydrocarbon-based aliphatic groups or parts and on the carbocyclic groups or parts are, for example, alkoxy groups in which the alkyl part is preferably as defined above.

The term "hydrolyzable monovalent group" that is concerned hereinabove as regards the symbols $G^2$ means groups such as, for example: halogen atoms, especially chlorine; groups —O-$G^5$ and —O—CO-$G^5$ in which $G^5$ represents: a saturated or unsaturated aliphatic hydrocarbon-based group, or a saturated, unsaturated and/or aromatic, monocyclic or polycyclic carbocyclic group, or a group containing a saturated or unsaturated aliphatic hydrocarbon-based part and a carbocyclic part as defined above, $G^5$ possibly being halogenated and/or substituted with one or more alkoxy groups; groups —O—N=C$G^6G^7$ in which $G^6$ and $G^7$ independently take any of the meanings given above for $G^5$, $G^6$ and $G^7$ possibly being halogenated and/or optionally substituted with one or more alkoxy groups; groups —O—N$G^6G^7$ in which $G^6$ and $G^7$ are as defined above.

Advantageously, such a hydrolyzable monovalent group is a radical as follows: linear or branched $C_1$-$C_8$ alkoxy optionally halogenated and/or optionally substituted with one or more ($C_1$-$C_8$)alkoxy; $C_2$-$C_9$ acyloxy optionally halogenated or optionally substituted with one or more ($C_1$-$C_8$)alkoxy; $C_5$-$C_{10}$ cycloalkyloxy; or $C_6$-$C_{18}$ aryloxy. By way of example, the hydrolyzable group is methoxy, ethoxy, n-propoxy, isopropoxy, n-butoxy, methoxymethoxy, ethoxyethoxy, methoxyethoxy, β-chloropropoxy, β-chloroethoxy or acetoxy.

As monovalent carbocyclic groups that may be formed, in formula (I), by the substituents $G^1$ and $G^2$ together and the silicon atom to which they are attached, mention will be made, for example, of the rings:

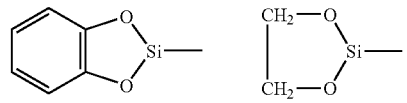

As single rings that may be formed by the substituents $G^3$ and $G^4$ together on the nitrogen atom present in the symbol A of formula (I), mention will be made, for example, of the following rings in which the free valency is borne by a nitrogen atom: pyrrole, imidazole, pyrazole, pyrrolidine, Δ2-pyrroline, imidazolidine, Δ2-imidazoline, pyrazolidine, Δ3-pyrazoline, piperidine; preferred examples are: pyrrole, imidazole and pyrazole.

Among the functionalized organosilicon compounds (A1), those that are suitable (compounds named SA1-1) are the compounds
consisting of:
(i) functionalized organosilanes corresponding to formula (I) in which: a+a'=3; m=n=o=p=0 (zero); and q=1;
(2i) functionalized siloxane oligomers corresponding to formula (I) in which: a+a'=1 or 2; m is in the range from 1 to 2; n=p=o=0 (zero); and q=1;
(3i) mixtures of species (i) and/or (2i);
and of the structures for which:
the symbols $G^0$, which may be identical or different, each represent one of the radicals chosen below for $G^1$ or $G^2$;
the symbols $G^1$, which may be identical or different, each represent: a linear or branched $C_1$-$C_8$ alkyl radical; a $C_5$-$C_{10}$ cycloalkyl radical or a $C_6$-$C_{18}$ aryl radical;
the symbols $G_2$, which may be identical or different, each represent: a hydroxyl radical or a linear or branched $C_1$-$C_8$ alkoxy radical, optionally substituted with one or more ($C_1$-$C_8$)alkoxy radicals;
Z represents the divalent radical —Z'—Z"— in which:
Z' represents: a $C_1$-$C_8$ alkylene chain; a saturated $C_5$-$C_{10}$ cycloalkylene group; a $C_6$-$C_{18}$ arylene group; or a divalent group consisting of a combination of at least two of these radicals;
Z" represents: a valency bond, —O— or —NR$^4$—, with R$^4$ being: a hydrogen atom; a linear or branched $C_1$-$C_8$ alkyl radical; a $C_5$-$C_{10}$ cycloalkyl radical; a $C_6$-$C_{18}$ aryl radical; or a ($C_6$-$C_{18}$)aryl-($C_1$-$C_8$)alkyl radical;
A denotes a group —O-$G^3$ or —N$G^4G^3$ in which $G^3$ and $G^4$, which may be identical or different, each represent: a linear or branched $C_1$-$C_8$ alkyl radical; a $C_5$-$C_{10}$ cycloalkyl radical or a $C_6$-$C_{18}$ aryl radical.

Among the functionalized organosilicon compounds (A1), those that are more particularly suitable (compounds named SA1-2) are the compounds
consisting of:
(i) functionalized organosilanes corresponding to formula (I) in which: a+a'=3; m=n=o=p=0 (zero); and q=1;
(2i) functionalized siloxane oligomers corresponding to formula (I) in which: a+a'=1 or 2; m is in the range from 1 to 2; n=p=o=0 (zero); and q=1;
(3i) mixtures of species (i) and/or (21);
and of the structures for which:
the symbols $G^0$, which may be identical or different, each represent one of the radicals chosen below for $G^1$ or $G^2$;

the symbols G¹, which may be identical or different, are chosen from the group formed by methyl, ethyl, propyl, isopropyl, cyclohexyl and phenyl radicals;

the symbols G², which may be identical or different, are chosen from the group formed by hydroxyl, methoxy, ethoxy, n-propoxy, isopropoxy, n-butoxy, methoxymethoxy, ethoxyethoxy and methoxyethoxy radicals;

Z represents the divalent radical —Z'—Z"— in which:
  Z' represents: a $C_1$-$C_8$ alkylene chain;
  Z" represents: a valency bond, —O— or —NR⁴—, with R⁴ being chosen from the group formed by: hydrogen and methyl, ethyl, propyl, isopropyl, n-butyl, isobutyl, t-butyl, pentyl, hexyl, cyclohexyl and benzyl radicals;

A denotes a group —O-G³ or —NG⁴G³ in which G³ and G⁴, which may be identical or different, are chosen from the group formed by methyl, ethyl, propyl, isopropyl, cyclohexyl and phenyl radicals.

Among the functionalized organosilicon compounds (A1), those that are especially suitable (compounds named SA1-3) are the compounds:

consisting of:
(i) functionalized organosilanes corresponding to formula (I) in which: a+a'=3; m=n=o=p=0 (zero); and q=1;
(2i) functionalized siloxane oligomers corresponding to formula (I) in which: a+a'=1 or 2; m is in the range from 1 to 2; n=p=o=0 (zero); and q=1;
(3i) mixtures of species (i) and/or (2i):
and of the structures for which:

the symbols G⁰, which may be identical or different, each represent one of the radicals chosen below for G¹ or G²;
the symbols G¹, which may be identical or different, are chosen from the group formed by methyl, ethyl, propyl, isopropyl, cyclohexyl and phenyl radicals;
the symbols G², which may be identical or different, are chosen from the group formed by hydroxyl, methoxy, ethoxy, n-propoxy, isopropoxy and n-butoxy radicals;

Z represents the divalent radical —Z'—Z"— in which:
  Z' is chosen from the group formed by the divalent radicals methylene, ethylene and propylene;
  Z" represents: a valency bond, —O— or —NR⁴—, with R⁴ being a hydrogen atom;

A denotes a group —O-G³ in which G³ is chosen from the group formed by methyl, ethyl, propyl, isopropyl, cyclohexyl and phenyl radicals.

As examples of functionalized organosilicon compounds (A1) that are especially suitable, mention will be made especially of the products of formula:

—(C₂H₅O)₃Si—(CH₂)₃—NH—CO—N═N—COOC₂H₅   (A1-1)

mixtures of the species (A1-1) with the species (A1-1') and (A1-1") below:

[(CH₃)₃SiO₁/₂][(C₂H₅O)₂{(CH₂)₃—NH—CO—N═N—COOC₂H₅}SiO₁/₂]   (A1-1')

[(CH₃)₃SiO₁/₂]₂[(C₂H₅O){(CH₂)₃—NH—CO—N═N—COOC₂H₅}SiO₂/₂]   (A1-1")

—(CH₃)₂(C₂H₅O)Si—(CH₂)₃—NH—CO—N═N—COOC₂H₅   (A1-2)

—(CH₃)(CH₃O)₂Si—(CH₂)₃NH—CO—N═N—COOCH3   (A1-3)

—(CH₃)₂(OH)Si—(CH₂)₃—NH—CO—N═N—COOCH₃   (A1-4)

—(C₂H₅)₂(OH)Si—(CH₂)₃—NH—CO—N═N—COOC₂H₅   (A1-5)

—(CH₃)(CH₃O)₂Si—(CH₂)₃—CO—N═N—COOCH₃   (A1-6)

—(CH₃)₂(OH)Si—(CH₂)₃—CO—N═N—COOCH₃   (A1-7)

—(C₂H₅)₂(OH)Si—(CH₂)₃—CO—N═N—COOC₂H₅   (A1-8)

Among the covering agents (A2), those that are suitable for use are the agents (ARA2-1) taken from the group formed by:
1) a functionalized polyorganosiloxane oil of formula:

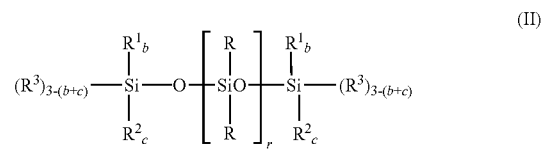

(II)

in which:
  b is 0 or 1,
  c is 0 or 1,
  with b+c=0, 1 or 2,
  r has a value (for example ranging from 3 to 200) sufficient to give the oil a dynamic viscosity at 25° C. of between 5 and 1000 mPa·s,
  the symbols R³ represent: a group OH with b+c=2 or a hydrolyzable group chosen from those represented by the symbol G² of formula (I),
  the symbols R¹, R² and R, which may be identical or different, each represent: a saturated or unsaturated aliphatic hydrocarbon-based group, or an aromatic carbocyclic group;

2) a polyol of formula:

HO—[—R⁴O—]ₛ—R⁴—OH   (III)

in which: s has a value sufficient to give the compound of formula (III) a number-average molecular mass of between 100 and 30 000; and the radicals R⁴, which may be identical or different, each represent a divalent residue chosen from a saturated or unsaturated aliphatic hydrocarbon-based group;

3) a hydroxylated or hydrolyzable silane of formula:

(R⁵)ₜSi(E)₄₋ₜ   (IV)

in which: the symbols R⁵ take any of the meanings given above for the symbol G¹ of formula (I); the symbols E are chosen from hydroxyl groups and the hydrolyzable groups having any of the meanings given above for the symbol G² of formula (I); and t is a number equal to 0, 1, 2 or 3;

4) a functionalized polyorganosiloxane of formula:

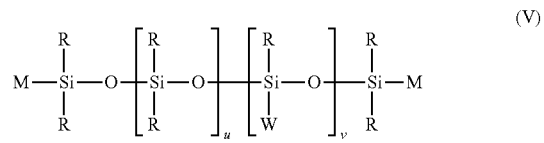

(V)

in which:
  the symbols M each represent a monovalent radical chosen from the radicals corresponding to the definitions of R and W,
  the symbols R are as defined above with regard to formula (II), the symbols W each represent an amino functional group —$R^6$—$NR^7R^5$ or —$R^6$—NH—$R^9$—$NR^7R^8$ in which: on the one hand, $R^6$ and $R^9$ each represent a divalent radical chosen from a saturated or unsaturated aliphatic hydrocarbon-based group, and, on the other hand, $R^7$ and $R^8$, which may be identical or different, each represent a hydrogen atom or a saturated or unsaturated aliphatic hydrocarbon-based group, the sum u+v is greater than or equal to 3,
u is an integer or fraction ranging from 0 to 100,
v is an integer or fraction ranging from 0 to 100,
with the condition according to which if v=0, at least one of the symbols M corresponds to a radical corresponding to the definition of W;

5) a compound of formula:

HO—$R^{10}$—$NR^{11}R^{12}$ (VI)

in which: $R^{10}$ represents a divalent residue chosen from a saturated or unsaturated aliphatic hydrocarbon-based group, and $R^{11}$ and $R^{12}$, which may be identical or different, each represent a hydrogen atom, a saturated or unsaturated aliphatic hydrocarbon-based group, or a group HO—$R^{10}$—;

6) a mixture of at least two of the abovementioned compounds 1) to 5).

Among the covering agents (A2), those that are more particularly suitable for use are the agents (ARA2-2) taken from the group formed by:

1') the polyorganosiloxanes of formula (II) in which:
 b=1, c=1 and b+c=2,
 r has a value (for example ranging from 3 to 60) sufficient to give the oil a dynamic viscosity at 25° C. of between 10 and 200 mPa·s,
 $R^3$=OH,
 $R^1$, $R^2$ and R, which may be identical or different, are chosen from the group formed by methyl, ethyl, propyl, isopropyl and phenyl radicals;

2') the polyols of formula (III) in which: s has a value sufficient to give the compound a number-average molecular mass ranging from 200 to 20 000; and the radicals $R^4$ each represent a linear or branched $C_1$-$C_8$ alkylene chain;

3') the silanes of formula (IV) in which: the radicals $R^5$, which may be identical or different, each represent a linear or branched $C_1$-$C_{16}$ alkyl radical, and the symbols E, which may be identical or different, are chosen from the group formed by hydroxyl, methoxy, ethoxy, n-propoxy, isopropoxy, n-butoxy, methoxymethoxy, ethoxyethoxy and methoxyethoxy radicals; and t=1, 2 or 3;

4') the polyorganosiloxanes of formula (V) in which:
 the symbols M each represent a monovalent radical chosen from the radicals corresponding to the definitions of R to W,
 the symbols R, which may be identical or different, are chosen from the group formed by methyl, ethyl, propyl, isopropyl and phenyl radicals,
 the symbols W each represent an amino group —$R^6$—$NR^7R^8$ in which $R^6$ is a $C_1$-$C_8$ alkylene chain and $R^7$=$R^8$=H,
 the sum u+v ranges from 3 to 100,
 0≦u≦60,
 0≦v≦40,
 with the condition according to which if v=0, the two symbols M correspond to a radical corresponding to the definition of W;

5') the compounds of formula (VI) in which $R^{10}$ is a linear or branched $C_1$-$C_8$ alkylene chain and $R^{11}$=$R^{12}$=H;

6') a mixture of at least two of the abovementioned compounds 1') to 5').

Among the covering agents (A2), those that are especially suitable for use are the agents (ARA2-3) taken from the group formed by:

1") the polyorganosiloxanes of formula (II) in which:
 b=1, c=1 and b+c=2,
 r has a value (ranging from 3 to 60) sufficient to give the oil a dynamic viscosity at 25° C. of between 10 and 200 mPa·s,
 $R^3$=OH,
 80% by number of the radicals $R^1$, $R^2$ and R, which may be identical or different, represent methyl radicals;

2") the polyols of formula (III) in which: s has a value sufficient to give the compound a number-average molecular mass ranging from 500 to 10 000; and the radicals $R^4$ are chosen from methylene, ethylene and propylene radicals;

3") the silanes of formula (IV) in which: the radicals $R^5$, which may be identical or different, are chosen from methyl, ethyl, propyl and phenyl radicals; the symbols E, which may be identical or different, are chosen from the group formed by methoxy, ethoxy, n-propoxy, isopropoxy and n-butoxy radicals; and t=1, 2 or 3;

4") the polyorganosiloxanes of formula (V) in which:
 the symbols M each represent a monovalent radical chosen from the radicals corresponding to the definitions of R to W,
 80% by number of the symbols R, which may be identical or different, represent methyl radicals,
 the symbols W each represent an amino group —$R^6$—$NR^7R^8$ in which $R^E$ is a methylene, ethylene or propylene radical and $R^7$=$R^8$=H,
 the sum u+v ranges from 3 to 100,
 0≦u≦60,
 0≦v≦40,
 with the condition according to which if v=0, the two symbols. M correspond to a radical corresponding to the definition of W;

5") the compounds of formula (VI) in which $R^{10}$ is a methylene, ethylene or propylene radical and $R^{11}$=$R^{12}$=H;

6") a mixture of at least two of the abovementioned compounds 1") to 5").

As examples of covering agents (A2) that are especially suitable for use, mention will be made especially of:
 the POSs 1") of formula:

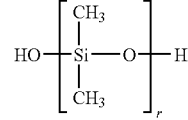

with r having a value (for example ranging from 3 to 10) sufficient to give the oil a dynamic viscosity at 25° C. of between 10 and 100 mPa·s;
 and/or the polyethylene glycols 2") with a molecular weight ranging from 3000 to 6000;
 and/or alkyltriethoxysilanes 3") in which the alkyl radical represents n-octyl or n-hexadecyl.

The functionalized organosilicon compounds (A1) of the type (i) may be prepared according to a synthetic process comprising the following steps:

(a): a precursor silane of formula:

$(G^2)_a(G^1)_a$Si—$P^1$ is reacted with a precursor hydrazo derivative of formula:

$P^2$—NH—NH—CO—A in which formulae the symbols $G^1$, $G^2$ and A are as defined above, $a+a'=3$ and $P^1$ and $P^2$ represent groups whose structure and functionality are such that these groups are capable of reacting with each other to give rise to the central chain —Z—CO— so as to lead to the hydrazo compound of formula:

   (VII)

(b): the compound of formula (VII) is subjected to an oxidation reaction of the hydrazo group according to the following scheme:

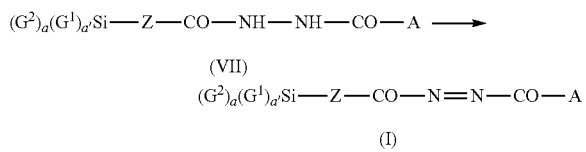

The oxidation of step (b) takes place readily by working using an oxidizing system based, for example, on N-bromosuccinimide and pyridine, used in stoichiometric amount or in excess relative to the latter.

In the case, for example, of the preparation of the functionalized organosilanes (A1) of formula (I) that are especially suitable for use, in the structure of which the symbol Z then represents the divalent radical —$(CH_2)_3$—NH—, the synthetic scheme that is applied is as follows:

(a): a precursor silane of formula:

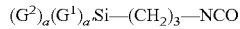

is reacted with a precursor hydrazo derivative of formula:

to give the hydrazo compound of formula:

   (VII)

(b): the compound of formula (VII) is subjected to an oxidation reaction of the hydrazo group according to the following scheme:

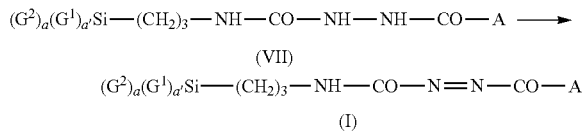

With regard to the practical manner of implementing the process just described, more details will be found in the content of FR-A-2340323.

The functionalized organosilicon compounds (A1) of the types (2i) and (3i) may be prepared according to a synthetic process that consists in:
oxidizing the hydrazo group of the precursor (IV) using an oxidizing system comprising at least one oxidizing agent (for example a halogen, for instance bromine) and at least one base (for example a mineral base, for instance $Na_2CO_3$),
including an additional reagent chosen from a mono- or polyalkoxysilane (for example trimethylethoxysilane), and
preferably working in an organic liquid medium (for example using a solvent such as dichloromethane).

One advantageous procedure for performing this process consists in:
placing in the reactor at room temperature (for example 23° C.): the precursor (IV), the base (its amount depending on the oxidizing agent used; for example, in the case of bromine, two molar equivalents of base are used relative to the bromine), the organic solvent and the additional reagent (its amount corresponding, for example, to at least one molar equivalent relative to the precursor),
and then gradually adding to the reaction medium the oxidizing system (its molar amount being, for example, stoichiometric relative to that of the precursor).

A person skilled in the art understands that the coupling agents (A1) described above may be pregrafted onto the reinforcing inorganic fillers, especially onto silica, via their function(s) "Y", the reinforcing inorganic fillers thus precoupled then possibly being bonded to the elastomer via their free function(s) "X".

The chemical compounds (A2) used herein as covering agents are known products, most of which are industrial products that are readily commercially available.

A person skilled in the art understands that all or part of the coupling system described above may be pregrafted onto the reinforcing inorganic fillers, especially onto silica, via its function(s) "Y", the reinforcing inorganic fillers thus precoupled then possibly being bonded to the elastomer via the free functions "X". All or part of the coupling system may also be pregrafted onto the isoprene elastomer via the functions "X", the elastomer thus functionalized then possibly being bonded to the inorganic filler via the free functions "Y". It is preferred, however, especially for reasons of better use of the rubber compositions in crude form, to use all or part of the coupling system either grafted onto the filler, or in free form (i.e. ungrafted).

Second Subject of the Invention

A second subject of the present invention concerns compositions comprising:
(B) at least one isoprene elastomer,
(C) a reinforcing inorganic filler, and
(A) an adequate amount of the coupling system consisting of the particular combination residing in the combination of ingredients (A1) and (A2) indicated above.

More specifically, these compositions comprise (the parts being given on a weight basis):
per 100 parts of isoprene elastomer(s),
from 10 to 200 parts of inorganic filler (C), preferably from 30 to 150 parts and more preferentially from 40 to 120 parts,
an amount of combinations (A1)+(A2) that provides in each composition:
0.5 to 15 parts and preferably 1 to 10 parts of ingredient (A1), and
0.5 to 10 parts and preferably 0.8 to 8 parts of ingredient (A2).

Advantageously, the amount of combination (A1)+(A2), in which the proportions of ingredients (A1) and (A2) are chosen in the abovementioned general and preferential regions, is determined such that it represents from 1% to 20%, preferably from 2% to 15% and more particularly from 3% to 10% relative to the weight of the reinforcing inorganic filler.

More advantageously, the proportions of the ingredients (A1) and (A2), on the one hand, chosen in the abovementioned general and preferential regions, and, on the other hand, giving a sum (A1)+(A2) advantageously lying in the abovementioned general and preferential regions, are also determined such that the ingredient (A1)/ingredient (A2)

weight ratio is in the range from 0.1 to 10, preferably from 0.15 to 5 and more preferentially from 0.3 to 3.

We will return hereinbelow to the definitions of the compound (B) consisting of at least one isoprene elastomer, and of compound (C) consisting of a reinforcing inorganic filler.

The term "isoprene elastomers" that are used for the compositions in accordance with the second subject of the invention more specifically means:
(1) the synthetic polyisoprenes obtained by homopolymerization of isoprene or 2-methyl-1,3-butadiene;
(2) the synthetic polyisoprenes obtained by copolymerization of isoprene with one or more ethylenically unsaturated monomers chosen from:
 (2.1) conjugated diene monomers, other than isoprene, containing from 4 to 22 carbon atoms, for instance: 1,3-butadiene, 2,3-dimethyl-1,3-butadiene, 2-chloro-1,3-butadiene (or chloroprene), 1-phenyl-1,3-butadiene, 1,3-pentadiene, 2,4-hexadiene;
 (2.2) aromatic vinyl monomers containing from 8 to 20 carbon atoms, for instance: styrene, ortho-, meta- or para-methylstyrene, the commercial mixture "vinyltoluene", para-tert-butylstyrene, methoxy-styrenes, chlorostyrenes, vinylmesitylene, divinylbenzene, vinylnaphthalene;
 (2.3) vinyl nitrile monomers containing from 3 to 12 carbon atoms, for instance acrylonitrile or methacrylonitrile;
 (2.4) acrylic ester monomers derived from acrylic acid or methacrylic acid with alkanols containing from 1 to 12 carbon atoms, for instance methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate;
 (2.5) a mixture of several of the abovementioned monomers (2.1) to (2.4);
   the polyisoprene copolymers containing between 99% and 20% by weight of isoprene units and between 1% and 80% by weight of diene, aromatic vinyl, vinyl nitrile and/or acrylic ester units, and consisting, for example, of poly(isoprene-butadiene), poly(isoprene-styrene) and poly(isoprene-butadiene-styrene);
(3) natural rubber;
(4) the copolymers obtained by copolymerization of isobutene and isoprene (butyl rubber), and also the halogenated versions, in particular the chlorinated or brominated versions, of these copolymers;
(5) a mixture of several of the abovementioned elastomers (1) to (4);
(6) a mixture containing a major amount (ranging from 51% to 99.5% and preferably from 70% to 99% by weight) of abovementioned elastomer (1) or (3) and a minor amount (ranging from 49% to 0.5% and preferably from 30% to 1% by weight) of one or more diene elastomers other than isoprene elastomers.

The expression "diene elastomer other than isoprene elastomer" means, as is known: the homopolymers obtained by polymerization of one of the conjugated diene monomers defined above in point (2.1), for instance polybutadiene and polychloroprene; the copolymers obtained by copolymerization of at least two of the abovementioned conjugated dienes (2.1) with each other or by copolymerization of one or more of the abovementioned conjugated dienes (2.1) with one or more of the abovementioned unsaturated monomers (2.2), (2.3) and/or (2.4), for instance poly(butadiene-styrene) and poly(butadiene-acrylonitrile); ternary copolymers obtained by copolymerization of ethylene, of an α-olefin containing from 3 to 6 carbon atoms with a non-conjugated diene monomer containing from 6 to 12 carbon atoms, for instance the elastomers obtained from ethylene or propylene with a non-conjugated diene monomer of the abovementioned type such as, especially, 1,4-hexadiene, ethylidene-norbornene, dicyclopentadiene (EPDM elastomer).

Use is preferentially made of one or more isoprene elastomers chosen from: (1) synthetic polyisoprene homopolymers; (2) synthetic polyisoprene copolymers consisting of poly(isoprene-butadiene), poly(isoprene-styrene) and poly(isoprene-butadiene-styrene); (3) natural rubber; (4) butyl rubber; (5) a mixture of the abovementioned elastomers (1) to (4); (6) a mixture containing a major amount of abovementioned elastomer (1) or (3) and a minor amount of diene elastomer other than isoprene elastomer consisting of polybutadiene, polychloroprene, poly(butadiene-styrene), poly(butadiene-acrylonitrile) and a terpolymer (non-conjugated ethylene-propylene-diene monomer).

Use is more preferentially made of one or more isoprene elastomers chosen from: (1) synthetic polyisoprene homopolymers; (3) natural rubber; (5) a mixture of the abovementioned elastomers (1) and (3); (6) a mixture containing a major amount of abovementioned elastomer (1) or (3) and a minor amount of diene elastomer other than isoprene elastomer, consisting of polybutadiene and poly(butadiene-styrene).

In the present specification, the term "reinforcing inorganic filler" means, as is known, an inorganic or mineral filler, irrespective of its color and its origin (natural or synthetic), also known as a "white" filler or occasionally a "clear" filler, as opposed to carbon black. The expression "reinforcing inorganic filler" also includes in its definition mixed fillers based on "white" filler and on carbon black. This inorganic filler should be capable of reinforcing, by itself, without any means other than an intermediate coupling agent, a technical rubber composition, in other words capable of replacing, in its reinforcing function, a conventional filler based only on carbon black.

The reinforcing inorganic filler may be in any physical state, i.e. said filler may be in the form of powder, granules or beads (micropearls).

Preferentially, the reinforcing inorganic filler or compound (C) consists of silica, alumina, carbon black totally or partially covered with silica and/or alumina, or a mixture of these species.

More preferentially, the reinforcing inorganic filler consists of silica, taken alone or as a mixture with alumina.

As silicas that may be used in the invention, any precipitated silica or fumed silica (combustion silica) known to those skilled in the art, preferably having a BET specific surface area of less than or equal to 450 $m^2/g$, is suitable for use. Precipitated silicas are preferred, the latter possibly being standard or highly dispersible.

The term "highly dispersible silica" means any silica having a very high capacity for disintegration and dispersion in a polymer matrix, which may be observed by electron microscopy or optical microscopy, on thin slices. Among the highly dispersible precipitated silicas that may be used, for example, are those with a CTAB specific surface area of less than or equal to 450 $m^2/g$ and preferably between 30 and 400 $m^2/g$, and in particular those described in U.S. Pat. No. 5,403,570 and patent applications WO-A-95/09127 and WO-A-95/09128, the contents of which are incorporated herein. As nonlimiting examples of such preferential highly dispersible silicas, mention may be made of the silicas Zeosil 1165 MP and 1115 MP from the company Rhodia, the silicas BV3380 and Ultrasil 7000 from the company Degussa, the silica Perkasil KS 430 from the company Akzo, the silicas Hi-Sil 2000 and Hi-Sil EZ 150G from the company PPG, the silicas Zeopol 8715, 8741, 8745 or 8755 from the company Huber. Treated precipitated silicas are also suitable for use, for instance the "aluminum-doped" silicas described in patent application EP-A-0 735 088, the content of which is also incorporated herein.

More preferentially, the precipitation silicas that are suitable for use are those having:
- a CTAB specific surface area of from 60 to 250 m²/g and preferably from 80 to 230 m²/g,
- a BET specific surface area of from 60 to 260 m²/g and preferably from 80 to 240 m²/g,
- a BET specific surface area/CTAB specific surface area ratio of from 1.0 to 1.6.

Needless to say, the term "silica" also means blends of different silicas. The CTAB specific surface area is determined according to the method NFT 45007 of November 1987. The BET specific surface area is determined according to the Brunauer-Emmett-Teller method described in "The Journal of the American Chemical Society, Vol. 60, page 309 (1938)" corresponding to the NF standard ISO 9277 of December 1996.

A reinforcing alumina that is advantageously used is a highly dispersible alumina having:
- a BET specific surface area of from 30 to 400 m²/g and preferably from 60 to 250 m²/g,
- a mean particle size of not more than 500 nm and preferably not more than 200 nm, and
- a high content of reactive surface Al—OH functions, for example as described in document EP-A-0 810 258.

As nonlimiting examples of such reinforcing aluminas, mention may be made especially of the aluminas A125, CR125 and D65CR from the company Baïkowski.

As carbon blacks totally or partially covered with a "white" filler, mention will be made especially of the products of the Ecoblack range from the company Cabot, and in particular the product referenced CRX 2000.

As other examples of inorganic filler that may be used in the rubber compositions of the invention, mention may also be made of aluminum (oxide) hydroxides, aluminosilicates, titanium oxides, silicon carbides or nitrides, all of the reinforcing type as described, for example, in patent applications WO-A-99/28376, WO-A-00/73372, WO-A-02/053634, WO-A-2004/003067 and WO-A-2004/056915.

The compositions in accordance with the invention also contain an ingredient (D) comprising all or part of the other auxiliary additives and constituents usually used in the field of elastomer and rubber compositions.

Thus, all or some of the other constituents and additives below may be used:
as regards the curing system, mention may be made, for example, of:
(D1): mandatorily, curing agents chosen from sulfur and sulfur-donating compounds, for instance thiuram derivatives; as regards sulfur, for example, it is used in a known manner at a content ranging from 0.5 to 10 and preferably from 0.5 to 5 parts by weight per 100 parts by weight of isoprene elastomer(s);
(D2): optionally, curing accelerators, for instance guanidine derivatives and sulfenamide derivatives; such an activator, when one is used, is employed in a known manner in a content ranging from 0.5 to 10 and preferably from 0.5 to 5 parts by weight per 100 parts by weight of elastomer(s);
(D3): optionally, curing activators, for instance zinc oxide, stearic acid and zinc stearate;

as regards other additive(s), mention may be made, for example, of:
(D4): optionally, a conventional reinforcing filler consisting of carbon black; suitable carbon blacks include any carbon black, especially blacks of the type HAD, ISAF and SAF; nonlimiting examples of such carbon blacks that may be mentioned include the carbon blacks N115, N134, N234, N339, N347 and N375; the amount of carbon black is determined such that, on the one hand, the reinforcing inorganic filler used represents more than 50% of the weight of the inorganic filler+carbon black assembly, and, on the other hand, the total amount of reinforcing filler (inorganic filler+carbon black) remains within the ranges of values indicated above, for the reinforcing inorganic filler, with regard to the weight constitution of the compositions;
(D5): optionally, a sparingly reinforcing or non-reinforcing conventional white filler, for instance clays, bentonite, talc, chalk, kaolin, titanium dioxide or a mixture of these species;
(D6): optionally, protecting agents, for instance antioxidants and/or antiozonizers, for instance N-phenyl-N'-(1,3-dimethylbutyl)-p-phenylenediamine;
(D7): optionally, plasticizers.

Third Subject of the Invention

A third subject of the present invention concerns the process for preparing the elastomer compositions comprising a reinforcing, inorganic filler and an effective amount of the coupling system. This process may be performed according to a standard procedure in two phases 1 and 2 in which:
phase 1 (known as the nonproductive "hot" step): all the necessary ingredients, with the general exception of the curing agent(s) (D1), are introduced into and blended in a standard internal mixer in one, two or more steps; by way of illustration, it is thus possible to introduce and blend all the ingredients defined below: elastomer(s) (B), inorganic filler (C), all or part of the covering agent (A2), optionally all or part of the coupling agent (A1), optionally one (or more) curing accelerator(s) (D2), optionally one (or more) curing activator(s) (D3), optionally one (or more) protecting agent(s) (D6), optionally one (or more) non-white reinforcing filler(s) (D4), optionally one (or more) sparingly reinforcing or non-reinforcing white filler(s) (D5), optionally one (or more) plasticizer(s) (D7); the process is performed at a temperature of between 40 and 200° C. and preferably between 60 and 180° C.; one or more subsequent step(s) of thermomechanical work may be performed in the internal mixer, after dropping the mixture and intermediate cooling (cooling temperature preferably less than 100° C.), for the purpose of subjecting the compositions to an additional thermomechanical treatment, especially to further improve the dispersion of the reinforcing inorganic filler and of the coupling agents in the elastomeric matrix; during such a subsequent step(s), it is possible to introduce one and/or the other of the necessary ingredients mentioned above;
phase 2 (referred to as the productive "cold" phase): the mixture thus obtained is then taken up in an external mixer and the curing agent(s) and optionally one or more other ingredient(s) is (are) added thereto; by way of illustration, the following ingredients are thus added: optionally all or the rest of the coupling agent (A1), optionally the rest of the covering agent (A2), one (or more) curing agent(s) (D1), optionally one (or more) curing accelerator(s) (D2), optionally one (or more) curing activator(s) (D3), optionally one (or more) protecting agent(s) (D6); the process is performed at a lower temperature, below 120° C. and preferably from 25 to 100° C.

According to a first preferential embodiment, the process for preparing the elastomeric compositions is performed according to the standard procedure in two phases 1 and 2 in which:

the covering agent (A2) is introduced in total during phase 1 at the same time as the inorganic filler;
whereas the coupling agent (A1) is:
either totally introduced during phase 1,
or totally introduced during phase 2,
or split between the two phases 1 and 2, the first fraction incorporated in phase 1 corresponding to a proportion of from 10% to 80% by weight, the second fraction incorporated in phase 2 corresponding to a proportion of from 90% to 20% by weight.

It should be noted that it is possible to introduce all or part of the coupling system in supported form (the placing on the support being performed beforehand) on a solid that is compatible with the chemical structures present in said coupling system; such a support consists especially of carbon black. For example, during the splitting of the coupling agent (A1) over the two phases 1 and 2, it may be advantageous to introduce the coupling agent into the external mixer of phase 2 after placing said agent on a support in order to facilitate its incorporation and dispersion.

The final composition obtained is then calendered, for example in the form of a sheet, a plaque or a profile that may be used for the manufacture of elastomeric articles.

The curing (or vulcanization) is performed, in a known manner, at a temperature generally ranging from 130 to 200° C., for a sufficient time that may range, for example, between 5 and 90 minutes as a function especially of the curing temperature, the curing system used and the curing kinetics of the composition under consideration.

It goes without saying that the present invention, taken in its second subject, concerns the elastomer compositions described above both in crude form (i.e. before curing) and in cured form (i.e. after crosslinking or curing).

Fourth Subject of the Invention

A fourth subject of the present invention concerns isoprene elastomeric articles having a body comprising the compositions described above in the context of the second subject of the invention. The present invention is particularly useful for preparing articles consisting, for example, of engine supports, shoe soles, rollers for cable cars, seals for electrical household appliances and cable sheaths.

The examples that follow illustrate the present invention.

EXAMPLE 1

This example illustrates the preparation of a coupling agent of the type (A1). The following reaction scheme was adopted:

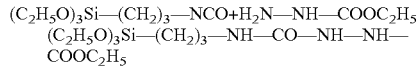

1) Synthesis of the Precursor Ingredient:
1.1) Fillers

| | | |
|---|---|---|
| 96% Isocyanatopropyltriethoxysilane | 99.8 g | 384 mmol |
| Ethyl carbazate | 41.2 g | 384 mmol |
| Anhydrous toluene | 384 ml | — |

1.2) Operating Protocol

The ethyl carbazate and the anhydrous toluene are placed at room temperature (23° C.) in the reactor, which is placed under an argon atmosphere.

The reactor is stirred at 300 rpm and the reaction mixture is then heated to 60° C. The reaction mixture becomes virtually homogeneous when hot.

The 99.8 g of silane are then added over 60 minutes using a pressure-equalized dropping funnel.

The reaction mixture is stirred for 2 hours at 60° C. and then cooled to room temperature.

The reaction mixture is left to stand for a few hours at room temperature.

A white solid crystallizes. It is then filtered off, washed with twice 150 ml of isopropyl ether and then drained under vacuum. The solid is finally oven-dried at 60° C. to constant weight m=131.5 g.

The product is analyzed by NMR (molar purity>99%). Yield=97.4%.

2) Synthesis of the Ingredient (A1-1):

The ingredient (A1-1) is obtained in one step from the precursor by oxidation of the hydrazino function to an azo function using an oxidizing system based on N-bromosuccinimide (NBS) and pyridine added in stoichiometric amounts relative to the precursor.

2.1) Fillers:

| | | |
|---|---|---|
| Precursor | 20.0 g | 57 mmol |
| 99% N-Bromosuccinimide | 10.13 g | 57 mmol |
| Pyridine | 4.5 g | 57 mmol |
| Dichloromethane | 100 ml | — |

2.2) Operating Protocol:

The precursor, the pyridine and the dichloromethane are placed in a reactor, which is placed under an argon atmosphere; the reaction medium is homogeneous and virtually colorless.

The N-bromosuccinimide is added spatulawise over 30 minutes. The temperature is maintained below 25° C. From the very first addition of NBS, the reaction medium turns bright orange.

The reaction medium is stirred at room temperature for 2 hours after the end of addition of the NBS.

The reaction medium is concentrated under reduced pressure on a rotary evaporator.

The residue, which is in the form of an orange paste, is taken up in 100 ml of a heptane/iPr$_2$O mixture (1/1: vol/vol) and then filtered through a porosity 4 sinter funnel (125 ml). The filter cake is washed with a further 4 times 25 ml of the above solvent mixture.

The mother liquors are filtered a second time through the cake. The filtrate is concentrated under reduced pressure.

An odorless bright orange liquid is obtained: m=18.8 g. This liquid is analyzed by NMR; its molar composition is as follows: ingredient (A1-1) 94.5 mol %; precursor compound: 0.2 mol %; succinimide: 5 mol % and pyridine residues: 0.3%.

EXAMPLE 2

The aim of this example is to demonstrate the coupling performance qualities (white filler-elastomer) of a particular combination consisting of the combination:

of an ingredient (A1) consisting essentially of the organosilane of formula:

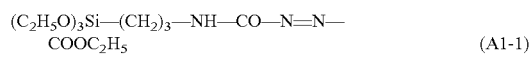
$$\text{(C}_2\text{H}_5\text{O)}_3\text{Si—(CH}_2\text{)}_3\text{—NH—CO—N=N—} \atop \text{COOC}_2\text{H}_5 \quad\quad\quad (\text{A1-1})$$

and of an ingredient (A2) consisting of the covering agent based on polyethylene glycol.

These performance qualities are compared firstly with that of a control rubber composition reinforced with carbon black, and secondly with that of another control composition reinforced with a siliceous filler and containing only a conventional coupling agent based on the silane TESPT:

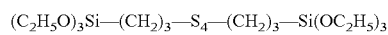
$$(\text{C}_2\text{H}_5\text{O})_3\text{Si—(CH}_2)_3\text{—S}_4\text{—(CH}_2)_3\text{—Si(OC}_2\text{H}_5)_3$$

4 representative elastomer compositions of shoe sole formulations are compared. These 4 compositions are identical except for the following differences:

composition 1 (control 1): reinforced with silica and comprising neither coupling agent nor covering agent;
composition 2 (control 2): reinforced with carbon black;
composition 3 (control 3): reinforced with silica and comprising a coupling agent that gives the composition 4 pce of silane TESPT;
composition 4: (example 2): combination of a coupling agent that gives the composition 3.8 pce of silanes (A1-1), introduced totally into the internal mixer, and of a covering agent (A2) also introduced totally into the internal mixer.

1) Constitution of the Elastomer Compositions:

The compositions whose constitution, expressed as parts by weight per 100 parts of elastomers (pce), is indicated in table I given below are prepared in an internal mixer of Brabender type:

TABLE I

| Composition | Control 1 | Control 2 | Control 3 | Example 2 |
|---|---|---|---|---|
| NR (1) | 80 | 80 | 80 | 80 |
| BR (2) | 20 | 20 | 20 | 20 |
| Silica (3) | 50 | — | 50 | 50 |
| Carbon black (N234) | — | 45 | — | — |
| Coupling agent 1 (4) | — | — | 4.0 | — |
| Coupling agent 2 (5) | — | — | — | 3.8 |
| Covering agent (6) | — | — | — | 1.0 |
| ZnO-80% | 3.75 | 3.75 | 3.75 | 3.75 |
| Stearic acid | 2.5 | 2.5 | 2.5 | 2.5 |
| Antioxidant (7) | 1.9 | 1.9 | 1.9 | 1.9 |
| Coupling agent 2 (5) | — | — | — | — |
| CBS-80% (8) | 1.88 | 1.88 | 1.88 | 1.88 |
| TBzTD (9) | 0.2 | 0.2 | 0.2 | 0.2 |
| Sulfur-80% | 1.88 | 1.88 | 1.88 | 1.88 |
| Carbon black (N330) | 4.0 | 4.0 | 4.0 | 4.0 |

Key:
(1) Natural rubber SMR - CV60 (supplied by the company Safic-Alcan).
(2) Polybutadiene or BR (Buna CB24 from the company Bayer) with 96% min of cis 1-4 and prepared by catalysis with neodymium.
(3) Silica (Z1165 MP from the company Rhodia) with BET and CTAB surface areas in the region of 150-160 m$^2$/g.
(4) TESPT (Silquest A1289 from the company GE-Osi).
(5) Ethyl [(3-triethoxysilylpropyl)amino]carbonyl-diazenecarboxylate (synthesized according to the procedure described in example 1).
(6) Hydroxylated polydimethylsiloxane oil blocked at each of the chain ends with a dimethylhydroxysilyl unit, having a viscosity of 50 mPa · s at 25° C.
(7) N-1,3-Dimethylbutyl-N-phenyl-para-phenylenediamine (Santoflex 6-PPD from the company Flexsys).
(8) N-Cyclohexyl-2-benzothiazylsulfenamide (Rhenogran CBS-80 from the company Bayer).
(9) Tetrabenzylthiuram disulfide (Perkacit TBzTD from the company Flexsys).

The coupling agents are used in a silicon isomolar content, i.e. irrespective of the composition, the same number of moles of functions "Y" herein ["Y"=Si(OC$_2$H$_5$)$_3$], which are reactive with silica and its surface hydroxyl groups, are used.

2) Preparation of the Elastomer Compositions:

The process for preparing the elastomer compositions is performed in two successive preparation phases. A first phase consists of a phase of thermomechanical work at high temperature. It is followed by a second phase of mechanical work at temperatures below 110° C. This phase allows the introduction of the curing system.

The first phase is performed using a blending machine, such as an internal mixer of Brabender brand (volume of 70 ml). The filling coefficient is 0.75. The initial temperature and the rotor speed are set each time so as to achieve mixture drop temperatures in the region of 140-160° C.

This makes it possible to incorporate the elastomers, and then the reinforcing filler (split introduction) with all or part of the coupling system, followed by the various curing activators (stearic acid, zinc oxide) and the protecting agent (6-PPD). For this phase, the duration is between 5 and 10 minutes.

After cooling the mixture (temperature below 100° C.), the second phase allows the introduction of the curing system (sulfur and accelerators) and optionally the rest of the coupling system and optionally a conventional reinforcing filler (carbon black). It is performed in a roll mixer preheated to 50° C. The duration of this phase is between 2 and 6 minutes.

The final composition is then calendered in the form of plaques 2-3 mm thick.

On these crude mixtures, an evaluation of their Theological properties makes it possible to optimize the duration and the curing temperature.

Next, the mechanical and dynamic properties of the optimally cured mixtures are measured.

3) Rheometry of the Compositions:

The measurements are taken on the compositions in crude form. Table II collates the results concerning the rheology test, which is performed at 150° C. using an ODR Monsanto 100 S rheometer according to standard DIN 53529.

According to this test, the composition to be tested is placed in the test chamber set at a temperature of 150° C. for 30 minutes, and the resistant torque, opposed by the composition, to an oscillation of weak amplitude (3°) of a biconical rotor included in the test chamber is measured, the composition completely filling the chamber under consideration.

From the curve of variation of the torque as a function of the time, the following are determined:

the minimum torque (Tm), which reflects the viscosity of the composition at the temperature under consideration;
the maximum torque (TM);
the delta-torque ($\Delta T = TM - Tm$) which reflects the degree of crosslinking entrained by the action of the crosslinking system and, if any, of the coupling agents;
the time T98 necessary to obtain a curing state corresponding to 98% of complete curing (this time is taken as the optimum curing time); and
the scorch time TS2 corresponding to the time necessary to have a rise of 2 points above the minimum torque at the temperature under consideration (150° C.) and which reflects the time during which it is possible to use the crude mixtures at this temperature without having any initiation of curing.

The results obtained are indicated in table II.

TABLE II

| Reference | Control 1 | Control 2 | Control 3 | Example 2 |
|---|---|---|---|---|
| Tm (dN · m) | 20.5 | 13.6 | 15.5 | 25.3 |
| TM (dN · m) | 74.5 | 86.4 | 82.9 | 91.7 |

TABLE II-continued

| Reference | Control 1 | Control 2 | Control 3 | Example 2 |
|---|---|---|---|---|
| Delta torque (dN · m) | 54 | 72.8 | 67.4 | 66.4 |
| TS 2 (min) | 6.27 | 4.13 | 7.92 | 8.05 |
| T98 (min) | 11.52 | 9.56 | 16.20 | 11.45 |
| Vcure max (dN · m/min) | 11.40 | 24.26 | 10.84 | 21.47 |

4) Mechanical Properties of the Cured Material:

The measurements are taken on the optimally cured compositions (T98) for a temperature of 150° C.

The uniaxial tensile tests are performed in accordance with the indications of standard NF T 46-002 with specimens of H2 type at a speed of 500 mm/min on an Instron 5564 machine. The 10%, 100% and 300% modulus values and the tensile strength are expressed in MPa; the elongation at break is expressed in %. It is possible to determine a reinforcing index from the ratio between the 300% modulus values and the modulus at 100% yield.

The Shore A hardness measurement on the cured materials is performed according to the indications of standard ASTM D 2240. The given value is measured at 15 seconds.

The measurement of the loss of mass by abrasion is performed according to the indications of standard DIN 53516, which uses a Zwick abrasimeter in which the cylindrical specimen is subjected to the action of an abrasive gauze of P60 grains and attached to the surface of a rotating drum at a contact pressure of 10N and over a course of 40 meters.

The value measured is a volume of loss of substance (in mm³) after abrasion wear; the smaller the value, the better the abrasion resistance.

The properties measured are collated in table III.

TABLE III

| Reference | Control 1 | Control 2 | Control 3 | Example 2 |
|---|---|---|---|---|
| 10 modulus (MPa) | 0.84 | 0.95 | 0.9 | 0.87 |
| 100 modulus (MPa) | 1.49 | 3.5 | 3.21 | 3.75 |
| 200 modulus (MPa) | 2.64 | 9.1 | 7.8 | 11.68 |
| 300 modulus (MPa) | 4.62 | 16.49 | 13.38 | 21.58 |
| Tensile strength (MPa) | 20 | 29 | 28.2 | 21.5 |
| Elongation at break (%) | 685 | 465 | 551 | 302 |
| R.I. = 200/100 | 1.77 | 2.60 | 2.43 | 3.11 |
| R.I. = 300/100 | 3.10 | 4.71 | 4.17 | 5.75 |
| Shore A hardness-15s (pts) | 54 | 66 | 66 | 65 |
| Loss on abrasion 10N (mm³) | 229 | 51 | 77 | 52 |

5) Dynamic Properties of the Cured Materials:

The mechanical properties are measured on a viscoanalyzer (Metravib VA3000) according to standard ASTM D5952.

The values for the loss factor (tan δ) and the complex dynamic compression modulus (E*) are recorded on cured samples (cylindrical specimen of cross section 95 mm² and of height 14 mm). The sample is subjected at the start to a 10% prebend and then to a sinusoidal compression bend alternating by plus or minus 2%. The measurements are taken at 60° C. and at a frequency of 10 Hz.

The results, presented in table IV, are the complex compression modulus (E*-60° C.-10 Hz) and the loss factor (tan δ-60° C.-10 Hz).

The loss factor (tan δ) and amplitude of elastic modulus in dynamic shear (ΔG') values are recorded on cured samples (parallelepipedal specimen of cross section 8 mm² and of height 7 mm). The sample is subjected to a sinusoidal bend in alternating double shear at a temperature of 40° C. and at a frequency of 10 Hz. The strain amplitude scanning processes are performed according to a to-and-fro cycle ranging from 0.1% to 50% followed by a return from 50% to 0.1%.

The results presented in table IV are obtained from the return strain amplitude scanning and concern the maximum value of the loss factor (tan δ max return-40° C.-10 Hz) and the amplitude of the elastic modulus (ΔG'-40° C.-10 Hz) between the values at 0.1% and 50% of strain (Payne effect).

TABLE IV

| Reference | Control 1 | Control 2 | Control 3 | Example 2 |
|---|---|---|---|---|
| E* - 60° C. - 10 Hz (MPa) | 9.4 | 9.65 | 8.60 | 7.71 |
| Tang δ - 60° C. - 10 Hz | 0.145 | 0.138 | 0.087 | 0.063 |
| Tang δ max return - 40° C. - 10 Hz | 0.176 | 0.187 | 0.134 | 0.092 |
| ΔG' - 40° C. - 10 Hz (MPa) | 3.15 | 3.19 | 1.71 | 0.98 |

Examination of the various tables II to IV shows that the composition in accordance with the invention (example 2) makes it possible to very markedly improve the compromise between reinforcement at large strains/hysteresis properties relative to that which is obtained with the control compositions (controls 1 to 3). It should be noted in particular that the composition of the invention, compared with the control composition 2 reinforced with black, unexpectedly reveals a significant improvement in the reinforcement index (R.I.=M300/M100 (multiplied by 1.22)).

The invention claimed is:

1. A rubber composition which comprises an isoprene elastomer and having incorporated therein:
(A) an effective amount of a polyfunctional coupling agent system having at least two functions designated "X" or "Y", which may be grafted onto the elastomer by means of the function "X", and onto the inorganic filler by means of the function "Y";
(B) at least one elastomer of rubber type, natural or synthetic;
(C) an inorganic filler as reinforcing filler;
(D) all or part of other constituents or additives selected from the group consisting of one or more curing agent(s) (D1), optionally, one or more curing accelerator(s) (D2), optionally, one or more curing activator(s) (D3), optionally, one or more non-white reinforcing filler(s) (D4), optionally, one or more non-reinforcing or sparingly reinforcing inorganic filler(s) (D5), optionally, one or more protecting agent(s) (D6), optionally, one or more plasticizer(s) (D7), and mixtures thereof;
wherein said polyfunctional coupling system (A) comprises the combination of constituents (A1) and (A2) below:
(A1) comprises at least one coupling agent selected from the group consisting of coupling agents in which each member is a functionalized organosilicon compound (I) comprising the structural units having the following general formula:

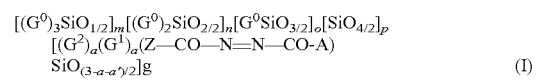

in which:
m, n, o and p each represent an integer or fraction greater than or equal to 0;
q represents an integer or fraction greater than or equal to 1;

a represents an integer selected from 0, 1, 2 and 3;
a' represents an integer selected from 0, 1 and 2;
the sum a+a' ranges from 0 to 3, with the conditions according to which:
when a=0, then at least one of the symbols $G^0$ has the definition given below for $G^2$;
and when a+a'=3, then
m=n=o=p=0(zero);
the symbols $G^0$, which may be identical or different, each represent one of the groups corresponding to $G^2$ or $G^1$;
the symbols $G^2$, which may be identical or different, each represent a hydroxyl group or a hydrolyzable monovalent group;
the symbols $G^1$, which may be identical or different, each represent a saturated or unsaturated aliphatic hydrocarbon-based group; a saturated or unsaturated and/or aromatic, monocyclic or polycyclic carbocyclic group; or a group representing a saturated or unsaturated aliphatic hydrocarbon-based moiety and a carbocyclic moiety as defined above; with the proviso that a group $G^1$ may together form, with a group $G^2$ and the silicon atom from which $G^1$ and $G^2$ depend, a monocyclic or polycyclic carbocyclic group having from 2 to 10 ring carbon atoms and optionally comprising one or more ring oxygen heteroatom(s);
the symbol Z represents a divalent radical selected from: a saturated or unsaturated aliphatic hydrocarbon-based group; a saturated, unsaturated and/or aromatic, monocyclic or polycyclic carbocyclic group; and a group containing a saturated or unsaturated aliphatic hydrocarbon-based moiety and a carbocyclic moiety as defined above; said divalent radical being optionally substituted or interrupted with an oxygen atom and/or a sulfur atom and/or a nitrogen atom, said nitrogen atom, if present, bearing one monovalent group selected from: a hydrogen atom; a saturated or unsaturated aliphatic hydrocarbon-based atom; a saturated or unsaturated and/or aromatic, monocyclic or polycyclic carbocyclic group; and a group containing a saturated or unsaturated aliphatic hydrocarbon-based moiety and a carbocyclic moiety as defined above;
the symbol A represents:
a saturated or unsaturated aliphatic hydrocarbon-based group; a saturated or unsaturated and/or aromatic, monocyclic or polycyclic carbocyclic group; or a group comprising a saturated or unsaturated aliphatic hydrocarbon-based moiety and a carbocyclic moiety as defined above;
a group —X-G3 in which: X represents —O—, —S— or -NG4- wherein G4 is as defined above for G1; G3, which may be identical to or different from G4, represents any of the groups G1; with the proviso that the substituents G3 and G4 of the group -NG4G3 may together form, with the nitrogen atom from which they depend, a single 5- to 7-membered ring having from 3 to 6 carbon atoms, 1 or 2 nitrogen atom(s) and, optionally, 1 or 2 unsaturated double bond(s);
or, when q=1, a group:

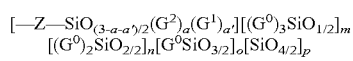

in which the symbols Z, $G^1$, $G^2$ are as defined above;
(A2) comprises at least one agent for covering the reinforcing filler comprising in its structure the sole function "Y", which is capable of physically and/or chemically bonding to the inorganic filler and of improving the dispersion of the filler in the rubber matrix and of lowering the viscosity of the composition.

2. The rubber composition as defined by claim 1, wherein said constituents (A1) comprise coupling agents for which each member is an organosilicon compound consisting essentially of:
(i) functionalized organosilanes corresponding to formula (I) in which: a +a'=3; m=n=o=p=0 (zero); and q=1;
(2i) functionalized siloxane oligomers corresponding to formula (I) in which: a+a' =1 or 2; m ranges from 1 to 2; n=p=o=0 (zero); and q=1;
(3i) mixtures of compounds (i) and/or (2i);
and of the compounds wherein:
the symbols $G^0$, which may be identical or different, each represent one of the radicals defined below for $G^1$ or $G^2$;
the symbols $G^1$, which may be identical or different, each represent a linear or branched $C_1$-$C_8$ alkyl radical; a $C_5$-$C_{10}$ cycloalkyl radical or a $C_6$-$C_{18}$ aryl radical;
the symbols $G_2$, which may be identical or different, each represent a hydroxyl radical or a linear or branched $C_1$-$C_8$ alkoxy radical, optionally substituted with one or more ($C_1$-$C_8$)alkoxy radicals;
Z represents the divalent radical —Z'—Z"— in which:
Z' represents a $C_1$-$C_8$ alkylene radical; a saturated $C_5$-$C_{10}$ cycloalkylene radical; a $C_6$-$C_{18}$ arylene radical; or a divalent radical comprising a combination of at least two such radicals;
Z" represents a valency bond, —O— or —$NR^4$—, wherein $R^4$ is a hydrogen atom; a linear or branched $C_1$-$C_8$ alkyl radical; a $C_5$-$C_{10}$ cycloalkyl radical; a $C_6$-$C_{18}$ aryl radical; or a ($C_6$-$C_{18}$)aryl-($C_1$-$C_8$)alkyl radical;
A is a group —O-$G^3$ or -$NG^4G^3$ in which $G^3$ and $G^4$, which may be identical or different, each represent a linear or branched $C_1$-$C_8$ alkyl radical; a $C_5$-$C_{10}$ cycloalkyl radical or a $C_6$-$C_{18}$ aryl radical.

3. The rubber composition as defined by claim 1, said constituents (A1) comprise coupling agents for which each member is an organosilicon compound consisting essentially of:
(i) functionalized organosilanes corresponding to formula (I) in which: a+a'=3; m=n=o=p=0 (zero); and q=1;
(2i) functionalized siloxane oligomers corresponding to formula (I) in which: a+a'=1 or 2; m ranges from 1 to 2; n=p=o=0 (zero); and q=1;
(3i) mixtures of compounds (i) and/or (2i);
and of the compounds wherein:
the symbols $G^0$, which may be identical or different, each represent one of the radicals defined below for $G^1$ or $G^2$;
the symbols $G^1$, which may be identical or different, are selected from the group consisting of methyl, ethyl, propyl, isopropyl, cyclohexyl and phenyl radicals;
the symbols $G^2$, which may be identical or different, are selected from the group consisting of hydroxyl, methoxy, ethoxy, n-propoxy, isopropoxy, n-butoxy, methoxymethoxy, ethoxyethoxy and methoxyethoxy radicals;
Z represents the divalent radical —Z'—Z"— in which:
Z' represents a $C_1$-$C_8$ alkylene radical;
Z" represents a valency bond, —O— or —$NR^4$—, wherein $R^4$ is selected from the group consisting of hydrogen, methyl, ethyl, propyl, isopropyl, n-butyl, isobutyl, t-butyl, pentyl, hexyl, cyclohexyl and benzyl radicals;
A is a group —O-$G^3$ or -$NG^4G^3$ in which $G^3$ and $G^4$, which may be identical or different, are selected from the group consisting of methyl, ethyl, propyl, isopropyl, cyclohexyl and phenyl radicals.

4. The rubber composition as defined by claim 1, wherein said constituents (A1) comprise coupling agents for which each member is an organosilicon compound constituted essentially of:
  (i) functionalized organosilanes corresponding to formula (I) in which: a+a'=3;m=n=o=p=0 (zero);and q=1;
  (2i) functionalized siloxane oligomers corresponding to formula (I) in which: a+a'=1 or 2; m ranges from 1 to 2; n=p=o=0 (zero); and q=1;
  (3i) mixtures of compounds (i) and/or (2i):
and of the compounds wherein:
  the symbols $G^0$, which may be identical or different, each represent one of the radicals defined below for $G^1$ or $G^2$;
  a represents an integer equal to 3;
  the symbols $G^1$, which may be identical or different, are selected from the group consisting of methyl, ethyl, propyl, isopropyl, cyclohexyl and phenyl radicals;
  the symbols $G^2$, which may be identical or different, are selected from the group consisting of hydroxyl, methoxy, ethoxy, n-propoxy, isopropoxy and n-butoxy radicals;
  Z represents the divalent radical —Z'—Z"— in which:
  Z' is selected from the group consisting of the divalent radicals methylene, ethylene and propylene;
  Z" represents a valency bond, —O— or —NR$^4$—, wherein R$^4$ is a hydrogen atom;
  A is a group —O-G$^3$ in which G$^3$ is selected from the group consisting of methyl, ethyl, propyl, isopropyl, cyclohexyl and phenyl radicals.

5. The rubber composition as defined by claim 1, wherein said constituents (A2) are selected from the group consisting of:
  1) a functionalized polyorganosiloxane oil of formula:

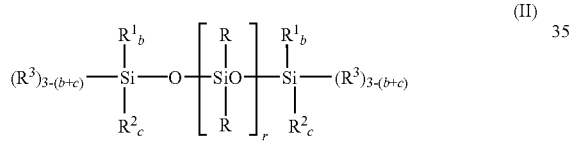

in which:
   b is 0 or 1,
   c is 0 or 1,
   with b+c=0, 1 or 2,
   r has a value sufficient to provide the oil a dynamic viscosity at 25° C. of from 5 to 1,000 mPa·s,
   the symbols $R^3$ represent a group OH with b+c=2 or a hydrolyzable group selected from the group consisting of those represented by the symbol $G^2$ of formula (I),
   the symbols $R^1$, $R^2$ and R, which may be identical or different, each represent a saturated or unsaturated aliphatic hydrocarbon-based radical, or an aromatic carbocyclic radical;
  2) a polyol of formula:

in which s has a value sufficient to provide the compound of formula (III) a number-average molecular mass of from 100 to 30,000; and the radicals $R^4$, which may be identical or different, each represent a divalent residue selected from the group consisting of a saturated or unsaturated aliphatic hydrocarbon-based radical;
  3) a hydroxylated or hydrolyzable silane of formula:

$$(R^5)_t Si(E)_{4-t} \qquad (IV)$$

in which the symbols $R^5$ are as defined above for the symbol $G^1$ of formula (I); the symbols E are selected from the group consisting of hydroxyl groups and the hydrolyzable groups having any of the above definitions for the symbol $G^2$ of formula (I); and t is a number equal to 0, 1, 2 or 3;
  4) a functionalized polyorganosiloxane of formula:

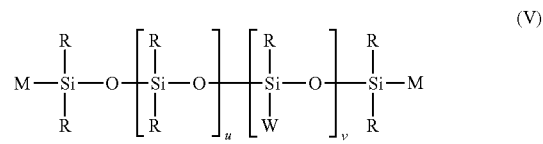

in which:
   the symbols M each represent a monovalent radical selected from the group consisting of the radicals corresponding to the definitions of R and W,
   the symbols R are as defined above with regard to formula (II),
   the symbols W each represent an amino functional group —R$^6$—NR$^7$R$^8$ or —R$^6$—NH—R$^9$—NR$^7$R$^8$ in which R$^6$ and R$^9$ each represent a divalent radical selected from the group consisting of a saturated or unsaturated aliphatic hydrocarbon-based radical, and R$^7$ and R$^8$, which may be identical or different, each represent a hydrogen atom or a saturated or unsaturated aliphatic hydrocarbon-based radical,
   the sum u+v is greater than or equal to 3,
   u is an integer or fraction ranging from 0 to 100,
   v is an integer or fraction ranging from 0 to 100,
   with the condition according to which if v=0, at least one of the symbols M corresponds to a radical corresponding to the definition of W;
  5) a compound of formula:

$$HO—R^{10}—NR^{11}R^{12} \qquad (VI)$$

in which R$^{10}$ represents a divalent residue selected from the group consisting of a saturated or unsaturated aliphatic hydrocarbon-based radical, and R$^{11}$ and R$^{12}$, which may be identical or different, each represent a hydrogen atom, a saturated or unsaturated aliphatic hydrocarbon-based radical, or a group HO—R$^{10}$—;
  6) a mixture of at least two of the above compounds 1) to 5).

6. The rubber composition as defined by claim 1, wherein said constituents (A2) are selected from the group consisting of:
  1') the polyorganosiloxanes of formula (II) in which:
   b=1,c=1 and b+c=2,
   r has a value sufficient to provide the oil a dynamic viscosity at 25° C. of from 10 to 200 mPa·s,
   $R^3$ =OH,
   $R^1$, $R^2$ and R, which may be identical or different, are selected from the group consisting of methyl, ethyl, propyl, isopropyl and phenyl radicals;
  2') the polyols of formula (III) in which s has a value sufficient to provide the compound a number-average molecular mass ranging from 200 to 20,000; and the radicals $R^4$ each represent a linear or branched $C_1$-$C_8$ alkylene radical;
  3') the silanes of formula (IV) in which the radicals $R^5$, which may be identical or different, each represent a linear or branched $C_1$-$C_{16}$ alkyl radical, and the symbols E, which may be identical or different, are selected from the group consisting of hydroxyl, methoxy, ethoxy, n-propoxy, isopropoxy, n-butoxy, methoxymethoxy, ethoxyethoxy and methoxyethoxy radicals; and t=1, 2 or 3;

4') the polyorganosiloxanes of formula (V) in which:
the symbols M each represent a monovalent radical selected from the group consisting of the radicals corresponding to the definitions of R to W,
the symbols R, which may be identical or different, are selected from the group consisting of methyl, ethyl, propyl, isopropyl and phenyl radicals,
the symbols W each represent an amino group —$R^6$—$NR^7R^8$ in which $R^6$ is a $C_1$-$C_8$ alkylene radical and $R^7$=$R^8$=H,
the sum u+v ranges from 3 to 100,
$0 \leq u \leq 60$,
$0 \leq v \leq 40$,
with the condition according to which if v=0, the two symbols M correspond to a radical corresponding to the definition of W;

5') the compounds of formula (VI) in which $R^{10}$ is a linear or branched $C_1$-$C_8$ alkylene radical and $R^{11}$=$R^{12}$=H;

6') a mixture of at least two of the above compounds 1') to 5').

7. The rubber composition as defined by claim 1, wherein said constituents (A2) are selected from the group consisting of:
1") the polyorganosiloxanes of formula (II) in which:
b=1, c=1 and b+c=2,
r has a value sufficient to provide the oil a dynamic viscosity at 25° C. of from 10 to 200 mPa·s,
$R^3$ =OH,
80% by number of the radicals $R^1$, $R^2$ and R, which may be identical or different, represent methyl radicals;

2") the polyols of formula (III) in which s has a value sufficient to provide the compound a number-average molecular mass ranging from 500 to 10,000; and the radicals $R^4$ are selected from the group consisting of methylene, ethylene and propylene radicals;

3") the silanes of formula (IV) in which the radicals $R^5$, which may be identical or different, are selected from the group consisting of methyl, ethyl, propyl and phenyl radicals; the symbols E, which may be identical or different, are selected from the group consisting of hydroxyl, methoxy, ethoxy, n-propoxy, isopropoxy and n-butoxy radicals; and t=1, 2 or 3;

4") the polyorganosiloxanes of formula (V) in which:
the symbols M each represent a monovalent radical selected from the group consisting of the radicals corresponding to the definitions of R to W,
80% by number of the symbols R, which may be identical or different, represent methyl radicals,
the symbols W each represent an amino group —$R^6$—$NR^7R^8$ in which $R^6$ is a methylene, ethylene or propylene radical and $R^7$=$R^8$=H,
the sum u+v ranges from 3 to 100,
$0 \leq u \leq 60$,
$0 \leq v \leq 40$,
with the condition according to which if v=0, the two symbols M correspond to a radical having the definition of W;

5") the compounds of formula (VI) in which $R^{10}$ is a methylene, ethylene or propylene radical and I$R^{11}$=$R^{12}$=H;

6") a mixture of at least two of the above compounds 1") to 5").

8. An elastomeric composition comprising:
(B) at least one isoprene elastomer,
(C) a reinforcing inorganic filler, and
(A) an effective amount of the coupling system which comprises the combination of constituents (A1) and (A2) as defined by claim 1.

9. The elastomer composition as defined by claim 8, comprising (the parts being given on a weight basis):
per 100 parts of isoprene elastomer(s),
from 10 to 200 parts of inorganic filler (C),
an amount of combinations (A1)+(A2) that provides in each composition:
0.5 to 15 parts of constituent (A1), and
0.5 to 10 parts of constituent (A2).

10. The elastomer composition as defined by claim 9, comprising (the parts being given on a weight basis):
per 100 parts of isoprene elastomer(s),
from 30 to 150 parts of inorganic filler (C),
an amount of combinations (A1)+(A2) that provides in each composition:
1 to 10 parts of constituent (A1), and
0.8 to 8 parts of constituent (A2).

11. The elastomer composition as defined by claim 8, wherein the isoprene elastomer(s) is (are) selected from the group consisting of:
(1) the synthetic polyisoprenes obtained by homopolymerization of isoprene or 2-methyl-1,3-butadiene;
(2) the synthetic polyisoprenes obtained by copolymerization of isoprene with one or more ethylenically unsaturated monomers selected from the group consisting of:
(2.1) conjugated diene monomers, other than isoprene, containing from 4 to 22 carbon atoms;
(2.2) aromatic vinyl monomers having from 8 to 20 carbon atoms;
(2.3) vinyl nitrile monomers having from 3 to 12 carbon atoms;
(2.4) acrylic ester monomers derived from acrylic acid or methacrylic acid with alkanols having from 1 to 12 carbon atoms;
(2.5) a mixture of more than one of the above monomers (2.1) to (2.4);
the polyisoprene copolymers containing from 99% to 20% by weight of isoprene units and between 1% to 80% by weight of diene, aromatic vinyl, vinyl nitrile and/or acrylic ester structural units;
(3) natural rubber;
(4) the copolymers obtained by copolymerization of isobutene and isoprene (butyl rubber), and also the halogenated derivatives of these copolymers;
(5) a mixture of more than one of the above elastomers (1) to (4);
(6) a mixture containing a major amount ranging from 51% to 99.5% by weight of the above elastomer (1) or (3) and a minor amount ranging from 49% to 0.5% by weight of one or more diene elastomers other than isoprene elastomers.

12. The elastomer composition as defined by claim 11, comprising one or more isoprene elastomers selected from the group consisting of (1) synthetic polyisoprene homopolymers; (2) synthetic polyisoprene copolymers which comprise poly(isoprene-butadiene), poly(isoprene-styrene) or poly(isoprene-butadiene-styrene); (3) natural rubber; (4) butyl rubber; (5) a mixture of the above elastomers (1) to (4); (6) a mixture containing a major amount of above elastomer (1) or (3) and a minor amount of diene elastomer other than isoprene elastomer comprising polybutadiene, polychloroprene, poly(butadiene-styrene), poly(butadiene-acrylonitrile) or a terpolymer (non-conjugated ethylene-propylene-diene monomer).

13. The elastomer composition as defined by claim 8, wherein the reinforcing inorganic filler comprises silica, whether alone or as a mixture with alumina.

14. The elastomer composition as defined by claim 13, wherein:
the silica is a precipitated silica having a BET specific surface area of less than or equal to 450 m²/g,
the alumina is a highly dispersible alumina having a BET specific surface area of from 30 to 400 m²/g and a high content of reactive surface Al—OH functions.

15. The elastomer composition as defined by claim 8, wherein it comprises other auxiliary additives or constituents which comprise:
as regards the curing system:
(D1): curing agents selected from the group consisting of sulfur and sulfur-donating compounds;
(D2): optionally, curing accelerators;
(D3): optionally, curing activators;
as regards other additive(s):
(D4): optionally, a conventional reinforcing filler comprising of carbon black;
(D5): optionally, a sparingly reinforcing or non-reinforcing conventional white filler;
(D6): optionally, protecting agents;
(D7): optionally, plasticizers.

16. A process for preparing the isoprene elastomer composition as defined by claim 8, comprising the following two phases 1 and 2:
phase 1: all the constituents, optionally with the exception of the curing agent(s), are introduced into and blended in an internal mixer, in one or more steps, at a temperature of from 40° to 200° C.;
phase 2: the mixture thus obtained is then transferred to an external mixer and the curing agent(s) and optionally one or more other ingredient(s) is (are) then added thereto, at a lower temperature, below 120° C.

17. The process as defined by claim 16, wherein:
the covering agent (A2) is introduced in total during phase 1 at the same time as the inorganic filler;
the coupling agent (A1) is:
either totally introduced during phase 1,
or totally introduced during phase 2,
or divided between the two phases 1 and 2, the first fraction incorporated in phase 1 corresponding to a proportion of from 10% to 80% by weight, the second fraction incorporated in phase 2 corresponding to a proportion of from 90% to 20% by weight.

18. An elastomeric shaped article comprising the composition as defined by claim 8.

19. The elastomer shaped article as defined by claim 18, comprising an engine support, a shoe sole, a roller for cable cars, a seal for an electrical household appliance or a cable sheath.

20. The rubber composition of claim 1, where the symbol Z represents a divalent radical selected from: a saturated or unsaturated aliphatic hydrocarbon-based group; a saturated, unsaturated and/or aromatic, monocyclic or polycyclic carbocyclic group; and a group containing a saturated or unsaturated aliphatic hydrocarbon-based moiety and a carbocyclic moiety as defined above; said divalent radical being optionally substituted or interrupted with an oxygen atom and/or a nitrogen atom, said nitrogen atom, if present, bearing one monovalent group selected from: a hydrogen atom; a saturated or unsaturated aliphatic hydrocarbon-based atom; a saturated or unsaturated and/or aromatic, monocyclic or polycyclic carbocyclic group; and a group containing a saturated or unsaturated aliphatic hydrocarbon-based moiety and a carbocyclic moiety as defined above.

* * * * *